March 18, 1930. F. B. CUMPSTON 1,751,307
COTTON GIN MACHINE
Filed Jan. 7, 1930

INVENTOR.
F. B. Cumpston,
BY John M. Spellman
ATTORNEY.

Patented Mar. 18, 1930

1,751,307

UNITED STATES PATENT OFFICE

FREDERICK B. CUMPSTON, OF BLOOMING GROVE, TEXAS, ASSIGNOR TO ASSOCIATED FACTORIES CORPORATION, OF DALLAS, TEXAS, A CORPORATION OF DELAWARE

COTTON-GIN MACHINE

Application filed January 7, 1930. Serial No. 419,125.

This invention relates to improvements in cotton gin machines and the primary object thereof is to provide a machine of this class whereby the cotton lint can be removed from the seed more expeditiously and in a greater volume within a given time than heretofore.

More specifically the invention provides a series of carding saws and a conveyor with other parts, all so arranged that the cotton in its passage through the machine is subjected to the action of these saws on all sides of the conveyor in which it is traveling, in the separation of the lint from the cotton seed. The machine in its construction embodies an arrangement whereby the ordinary gin ribs are eliminated. The saws are also disposed in fairly close relation on their respective shafts in such a way that a much greater saw action is obtained than with saws arranged in the ordinary way.

The invention will be clearly understood from a perusal of the following detailed description, taken in connection with the accompanying drawings forming part of this specification and wherein.

Figure 1:
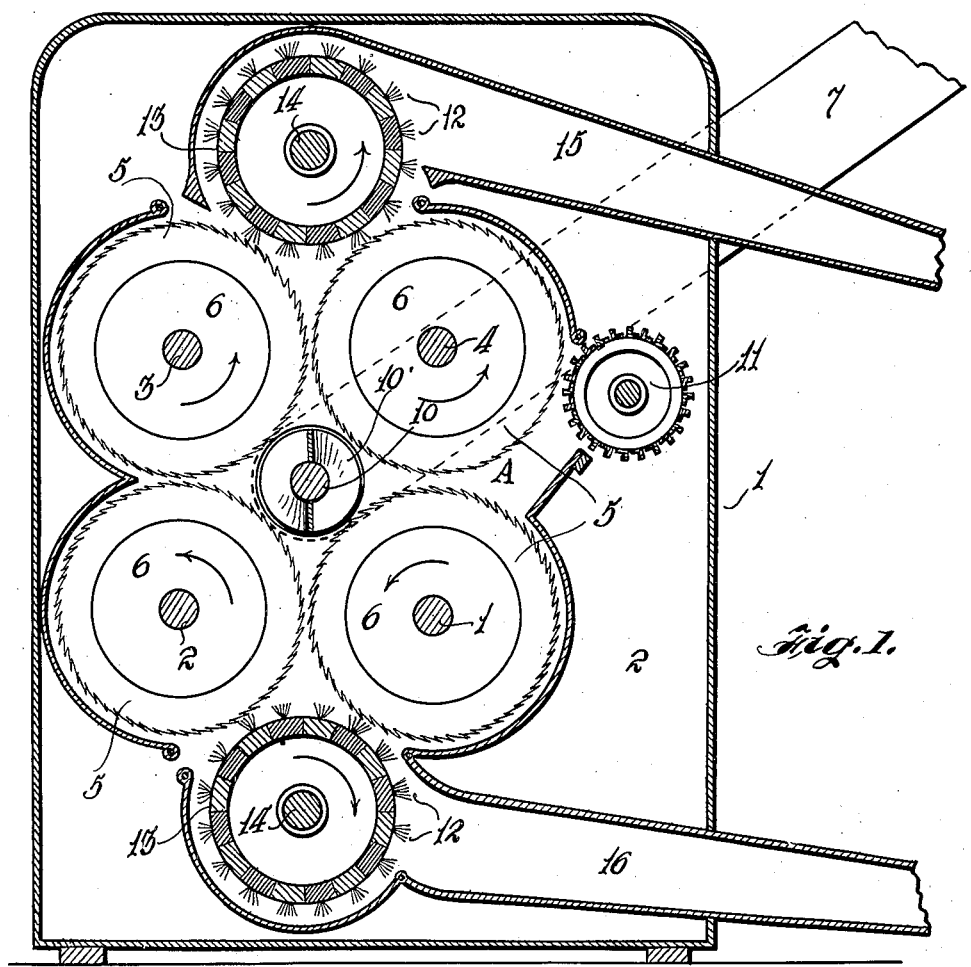
Figure 1 represents a vertical sectional view through the machine.
Figure 2:
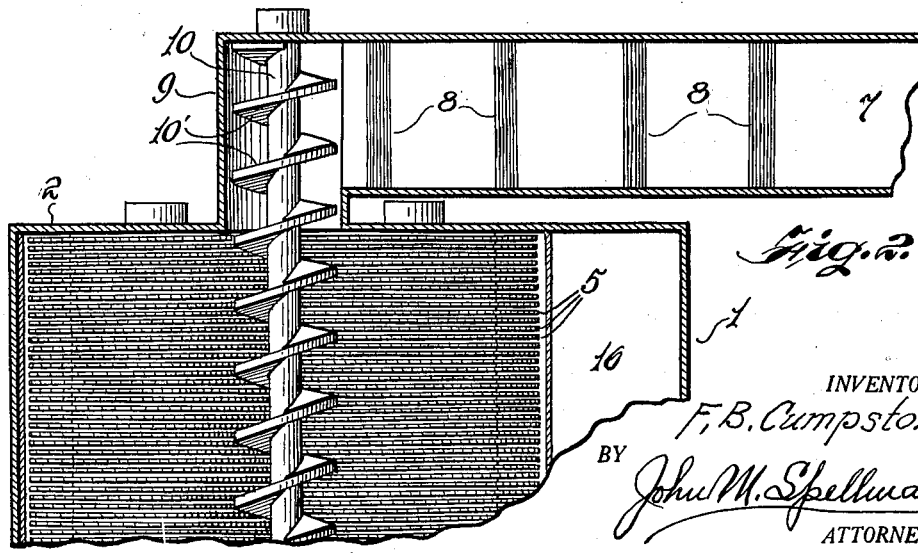
Figure 2 represents a partial horizontal sectional view taken at approximately the center of the machine.

Proceeding in accordance with the drawings, the numeral 1 denotes a casing or housing in the walls 2 of which are journaled the shafts 1, 2, 3 and 4. On each of these shafts are disposed in close relation the carding saws 5, the saws being provided with a spacer element 6.

The cotton is delivered to the machine through the chute 7 and in the latter are a number of magnets 8 for the purpose of attracting any small metallic objects which might be present in the cotton. This chute is connected to one end of a conveyor box or trough 9 in which is mounted the conveyor shaft 10 carrying the blades 10', the shaft being suitably mounted and journaled in the housing and is rotated slowly and thus carries the cotton along between the teeth of adjacent saws mounted on the shafts 1 to 4 inclusive. These saw shafts are made to rotate at different speeds beginning with the shaft 1 and increasing in speed ratio to shaft 4 and as will be apparent from Figure 1 these shafts are spaced just far enough apart to permit the teeth of the adjacent saw series on each shaft to come very close together, say about one-eighth of an inch, which distance permits the lint to pass between the teeth of the saws on each shaft. This arrangement is carried out in the disposition of all the saw series, except that the shaft 4, immediately above the shaft 1, is spaced a little farther than the other shafts to provide a space A. The purpose of this is to permit any cotton which may have become wadded or balled up to pass through the space A and thus prevent jamming or clogging of the machine. Such obstruction will be thrown out through this space by centrifugal force, but is caught by the stripper 11 and maintained in contact with the saws until such wadded cotton is thoroughly ginned.

The lint from the cotton is doffed from the saws by the brushes 12 on the roller 13, carried on the shaft 14, there being an upper and a lower doffing brush construction similar in form. Both upper and lower brushes are provided with a lint flue 15 and 16. The various shafts are rotated by any suitable means, such as a pulley and belt arrangement. The conveyor shaft is rotated relatively slowly to permit the cotton to be subjected to the action of the carding saws as the cotton is rolled and passed along by the blades and between the adjacent saw teeth of each series of saws.

The subject matter of several preceding applications for patent by the applicant herein involved the principle by which the present arrangement of saws is operated. The construction herein described and illustrated, however, includes an improvement in the manner of disposition of the saws in connection with the conveyor. In this connection, the saws on each shaft co-act with the saws on adjacent saw shafts, all of these shafts rotating in the same direction. The saws also co-act with the conveyor in such manner as to cause the cotton to be combed and carded between the teeth of the saws on opposite shafts, while the conveyor maintains the cotton mass or roll into contact with the saws. Simultaneous with the rotating movement of the mass of cotton the conveyor carries the fibre through the machine and the saws thus have constant contact on all sides of the cotton in the conveyor. The seed after the cotton is separated therefrom is carried by the conveyor and dropped into a seed box or receptacle at one end of the machine.

The machine is capable of relinting cotton seed as well as for ordinary cotton ginning, that is removing the small fibre from the seed leaving the latter in a smooth condition such as is necessary in the production of cotton seed oil and the like.

While saws have been disclosed as the preferred form of ginning instrumentalities, it is obvious that any desired means may be substituted for saws, without departing from the spirit of the invention. It will be particularly noted that the ginning instrumentalities are arranged in a series surrounding the conveyor, the adjacent pairs of such series being spaced apart sufficiently to permit passage of lint between the ginning instrumentalities, and one pair of the series being spaced apart a distance slightly greater than the others to allow wadded cotton to pass between this pair of rotating members.

While the disclosure recites a practical working embodiment of the machine, it is capable of modifications and alterations, such as would be within the scope and meaning of the appended claims.

What is claimed as new is:

1. A cotton gin comprising a centrally located screw conveyor for passing cotton from a hopper between coacting ginning instrumentalities, said ginning instrumentalities comprising a plurality of rotating saw assemblies having their axes parallel to the axis of the conveyor, and substantially equidistant from the conveyor axis, the peripheries of adjacent saw assemblies being spaced apart slightly from each other so as not to intersect a plane placed between them and spaced from the conveyor.

2. A cotton gin comprising a centrally located screw conveyor for passing cotton from a hopper between ginning instrumentalities, said ginning instrumentalities having their axes parallel to the axis of the conveyor, and substantially equidistant from the conveyor axis, said ginning instrumentalities rotating at progressively increasing rates, starting from a selected ginning instrumentality having a selected minimum rate and progressing clockwise with the axis of the screw conveyor as a center to a ginning instrumentality of a selected maximum rate.

3. A cotton gin comprising a centrally located screw conveyor for passing cotton from a hopper between ginning instrumentalities, said ginning instrumentalities having their axes parallel to the axis of the conveyor, and substantially equidistant from the conveyor axis, said ginning instrumentalities rotating at progressively increasing rates, starting from a selected ginning instrumentality having a selected minimum rate and progressing clockwise with the axis of the screw conveyor as a center to a ginning intrumentality of a selected maximum rate, and the peripheries of said ginning instrumentalities being spaced apart slightly from each other and from the conveyor, the ginning instrumentality of minimum rate of rotation being adjacent the ginning instrumentality of maximum rate of rotation, and the distance between the last mentioned pair of ginning instrumentalities being somewhat greater than the distance between other ginning instrumentalities.

4. A cotton gin comprising a centrally located screw conveyor for passing cotton from a hopper between ginning instrumentalities, said ginning instrumentalities having their axes parallel to the axis of the conveyor, and substantially equidistant from the conveyor axis, said ginning instrumentalities rotating at progressively increasing rates, starting from a selected ginning instrumentality having a selected minimum rate and progressing clockwise with the axis of the screw conveyor as a center to a ginning instrumentality of a selected maximum rate, and the peripheries of said ginning instrumentalities being spaced apart slightly from each other and from the conveyor, the ginning instrumentality of minimum rate of rotation being adjacent the ginning instrumentality of maximum rate of rotation, and the distance between the last mentioned pair of ginning instrumentalities being somewhat greater than the distance between other ginning instrumentalities, and a stripper adjacent the outlet between the said pair of ginning instrumentalities.

5. A cotton gin comprising a centrally located rotating screw conveyor, a chute for delivering cotton to one end of said screw conveyor, upper and lower pairs of ginning instrumentalities surrounding said conveyor rotating about axes parallel to the axis of said screw conveyor, said ginning instrumentalities being spaced apart slightly from each other and from the screw conveyor, and all rotating in the same direction, but at successively increasing speeds beginning with the lower right hand ginning instrumentality and progressing clockwise about the axis of the conveyor to the upper right hand ginning instrumentality, and the distance between the upper and lower right hand pair of ginning instrumentalities being somewhat greater than the distance between other pairs of ginning instrumentalities.

6. A cotton gin comprising a centrally located screw conveyor, a chute for feeding cotton to said conveyor, upper and lower pairs of ginning instrumentalities surrounding said screw conveyor, the peripheries of the adjacent ginning instrumentalities being spaced apart slightly from each other so as not to intersect a plane placed between them and spaced, said ginning instrumentalities rotating about axes parallel to the axis of the screw conveyor, a pair of doffer rolls co-acting respectively with the upper and lower pairs of ginning instrumentalities, and lint flues leading from said doffer rolls.

7. A ribless cotton gin, linter or delinter, comprising a centrally located conveyor for passing cotton from a hopper between surrounding means for stripping the lint from the seed, said stripping means consisting solely of a series of coacting ginning instrumentalities all rotating in the same direction about parallel axes, adjacent members of the series being spaced apart sufficiently so as not to intersect a plane placed between them and spaced to permit passage of lint between them.

8. A ribless cotton gin, linter or delinter, comprising a centrally located conveyor for passing cotton from a hopper between surrounding means for stripping the lint from the seed, said stripping means consisting solely of a series of coacting ginning instrumentalities all rotating in the same direction about parallel axes, adjacent members of the series being spaced apart sufficiently so as not to intersect a plane placed between them and spaced to permit passage of lint between them, said ginning instrumentalities being arranged in two horizontally disposed pairs, one above the other.

9. A ribless cotton gin, linter or delinter, comprising a centrally located conveyor for passing cotton from a hopper between surrounding means for stripping the lint from the seed, said stripping means consisting solely of a series of coacting ginning instrumentalities all rotating in the same direction about parallel axes, adjacent members of the series being spaced apart sufficiently to permit passage of lint between them, said ginning instrumentalities being arranged to surround the conveyor, adjacent members of one pair of said series being spaced apart from each other a distance sufficient to permit wadded cotton to pass between them, and a stripper roll adjacent said last-named pair of ginning instrumentalities.

10. A ribless cotton gin, linter or delinter, comprising a series of rotating ginning instrumentalities, a centrally located cotton conveyor, said ginning instrumentalities being arranged to surround said conveyor, adjacent members of one pair of said series being spaced apart from each other a distance sufficient to permit wadded cotton to pass between them, and a stripper roll adjacent said spaced apart pair of ginning instrumentalities.

11. A cotton gin comprising a centrally located conveyor, means for feeding cotton to one end of the conveyor, and a plurality of coacting rotating ginning instrumentalities surrounding said conveyor having axes parallel to said conveyor, adjacent ginning instrumentalities being spaced apart from each other so as not to intersect a plane placed between them and spaced a distance sufficient to permit passage of lint between them.

12. A cotton gin comprising a centrally located conveyor for passing cotton from a feed hopper at one end between ginning instrumentalities for stripping the lint from the cotton seed, adjacent ginning instrumentalities being spaced apart from each other so as not to intersect a plane placed between them, said ginning instrumentalities surrounding said conveyor, and rotatable about axes parallel to the conveyor.

13. A cotton gin comprising a centrally located screw conveyor for passing cotton from a hopper between coacting ginning instrumentalities, adjacent ginning instrumentalities having their axes parallel to the axis of the conveyor, and substantially equidistant from the conveyor axis, and being spaced apart from each other so as not to intersect a plane placed between them and spaced a distance sufficient to permit passage of lint between them.

In testimony whereof I affix my signature.

FREDERICK B. CUMPSTON.